(12) United States Patent
Benedetti et al.

(10) Patent No.: US 6,726,419 B2
(45) Date of Patent: Apr. 27, 2004

(54) RETENTION PIN REDUNDANCY SYSTEM

(75) Inventors: Steven Michael Benedetti, Sterling Heights, MI (US); Jason Aaron Meyers, Utica, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/234,763

(22) Filed: Sep. 3, 2002

(65) Prior Publication Data

US 2004/0042874 A1 Mar. 4, 2004

(51) Int. Cl.$^7$ ................................................ F16B 21/14
(52) U.S. Cl. ..................... 411/377; 411/373; 411/513; 411/910; 292/307 B
(58) Field of Search ................................ 411/513, 514, 411/515, 372.5, 372.6, 373, 377, 431, 910; 292/307 B

(56) References Cited

U.S. PATENT DOCUMENTS

| 1,914,773 A | * | 6/1933 | Fisher | 40/203 |
|---|---|---|---|---|
| 2,391,140 A | * | 12/1945 | Dilley | 411/513 |
| 2,857,597 A | * | 10/1958 | Morgan, Jr. | 2/414 |
| 4,214,505 A | * | 7/1980 | Aimar | 411/373 |
| 4,543,024 A | * | 9/1985 | Hackney | 411/364 |
| 5,103,538 A | * | 4/1992 | Ryder | 24/662 |
| 5,270,503 A | * | 12/1993 | Frye | 200/43.14 |
| 5,653,564 A | * | 8/1997 | Nakamura | 411/373 |
| 6,012,889 A | * | 1/2000 | Robbins et al. | 411/372.6 |

* cited by examiner

Primary Examiner—Gary Hartmann
(74) Attorney, Agent, or Firm—Harness, Dickey & Pierce, P.L.C.

(57) ABSTRACT

A retention pin redundancy system and installation method provides a housing having multiple shoulders to encapsulate an installed retention pin and its connecting pin only when the retention pin is fully engaged. Another aspect includes a living hinge. A further aspect provides engagement devices to lock the redundancy clip.

10 Claims, 10 Drawing Sheets

RETENTION PIN REDUNDANCY SYSTEM

BACKGROUND

The invention relates generally to fastening systems and more particularly to a system and process for securing an installation of components joined by a pin and retention element.

It is well known to secure one or more components by mounting the component(s) onto a pin, where the pin has a through aperture at its distal end for receiving a retention device such as a retention pin. The retention pin is normally deformed such that the deformation prevents removal of the retention pin through the aperture. It is also well known that retention pins (e.g., cotter pins) can be secured to the installation through the use of lock wires and similar devices.

A pinned connection is conventionally formed by providing a pin of known diameter mounted to a structure or one of a set of items to be joined. The pin is typically provided with a through aperture disposed at a pin distal end such that a retention pin (i.e., a cotter pin or similar device) can be slid into the aperture and deformed thereby preventing removal of the retention pin and therefore removal of the equipment thus secured. The parts to be joined are provided with an aperture sized to slidably mate with the pin diameter. The pin length is normally selected such that the pin extends slightly beyond the total thickness of the parts to be joined exposing the entire diameter of the aperture. This insures that the retention pin can engage the aperture through the pin while preventing excessive clearance between the retention pin and the components to be joined. Excessive clearance can result in loose fit, excessive vibration or motion and damage to the components to be joined or surrounding components. Retention pins known in the art are typically provided of a metal material which is bendable either by hand or with tools such that at least a portion of the retention element is deformed to prevent pin removal from the pin aperture. Retention elements known in the art are provided in standard sizes and diameters to suit the pin aperture and the strength required to connect the parts to be joined. Dimensions for the retention element, including the length, are therefore well known.

A common form of retention element is the cotter pin. The cotter pin is available in several forms, however, the simplest form is a pin having a loop of material on a first end and two legs distally extending from the loop wherein the legs are initially butted to each other. The legs are slid into a pin aperture and at least one of the legs is deformed such that the diameter of the leg pair increases beyond the pin aperture preventing removal of the cotter pin. Other cotter pin type retention elements are available which include a first leg which is inserted into a pin aperture and a second leg which by spring force deflects above or about the pin such that the second leg retains the cotter pin in the assembly by a spring force. A drawback of retention elements in general and the cotter pin specifically is that an installation of the retention element can be provided wherein insufficient bending or deflection of at least one of the elements of the retention element is performed and subsequent vibration of the component parts and retention element causes the retention element to slip free from the pin aperture. A drawback of the spring type cotter pin is that if insufficient force is used to apply the spring leg over the pin to a fully engaged position, the cotter pin can vibrate loose from the installation.

It is therefore a common practice to apply additional retention elements to a retention pin installation to ensure that the pin cannot displace from its installed position. Known examples include deformable devices which anchor in the looped end of a cotter pin and provide a male engagement member to engage at least one of the legs of the cotter pin. The disadvantage of deformable devices is the relative ease with which some of the devices either fall off or are displaceable from the retention element. A further known device uses lock-wire which is twisted about the loop end of a cotter pin and around the legs of the cotter pin to insure that the cotter pin stays in place. The ease of failure of the above devices contrasts with the degree of installation difficulty that lock-wire imparts and the degree of difficulty in removing the lock-wire which therefore prevents easy access to the assembled parts. The devices described above do not by their design ensure that the retention element is in a fully engaged position when the device is installed. For example, the spring type cotter pin as discussed above can be installed in an incompletely engaged position and the subsequent installation of a device will not insure that the cotter pin fully engages with the pin aperture.

SUMMARY OF THE INVENTION

In accordance with a preferred embodiment of the present invention, a pin redundancy system provides a multi-part housing which encapsulates a retention element such as a cotter pin as well as the pin end where the retention element is located only when the retention element is in a fully engaged position. In another aspect of the present invention, a retention pin redundancy system includes at least one retention element to prevent displacement of a retention pin. A further aspect of the present invention provides a redundancy clip having hook engagement devices to both close and self lock the redundancy clip. In still another aspect of the present invention, a polymeric retention pin redundancy clip is provided which includes a lever integrally disposed adjacent to a living hinge engaging a lever engagement embossment such that a failure of the living hinge does not result in opening of the redundancy clip. In yet another aspect of the present invention, a process for confirming a correct installation of a retaining pin is provided. In still another aspect of the present invention a method for applying a cotter pin redundancy clip is provided.

The redundancy clip system and method of the present invention are advantageous over conventional devices in that the present invention provides a positive method/device to ensure that the retention element is in a fully engaged position with the pin prior to engagement of the redundancy clip. The dimensions of the pin and the retention element are known. These dimensions are incorporated within the redundancy clip of the present invention such that individual sections of the redundancy clip enclose distal ends of the pin about a pin clearance aperture provided in the redundancy clip. Features of the redundancy clip including a combination of a predetermined body cavity and integral shoulders prevent the clip from closing about the pin if the retention element is not fully engaged through the pin. The redundancy clip of the present invention is preferably provided in a lightweight moldable material such that installation can be performed manually and the clip can be sized to suit arrangements which are difficult to access.

A redundancy clip of the present invention also provides a positive locking element which deflects and snaps into engagement with a hook retention element to hold the redundancy clip closed. A living hinge can be operated multiple times to perform maintenance work on the component. Envelope characteristics of the redundancy clip can be easily varied such that a wide variety of pins, retention elements, installation geometries, and access for both removal and replacement of a redundancy clip of the present invention can be provided. Advantages of the redundancy clip of the present invention include: the ability to encapsulate a retention pin to ensure the retention pin is in a fully engaged position; light weight; installation/removal ease using a living hinge; and a removable, self-locking feature. Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
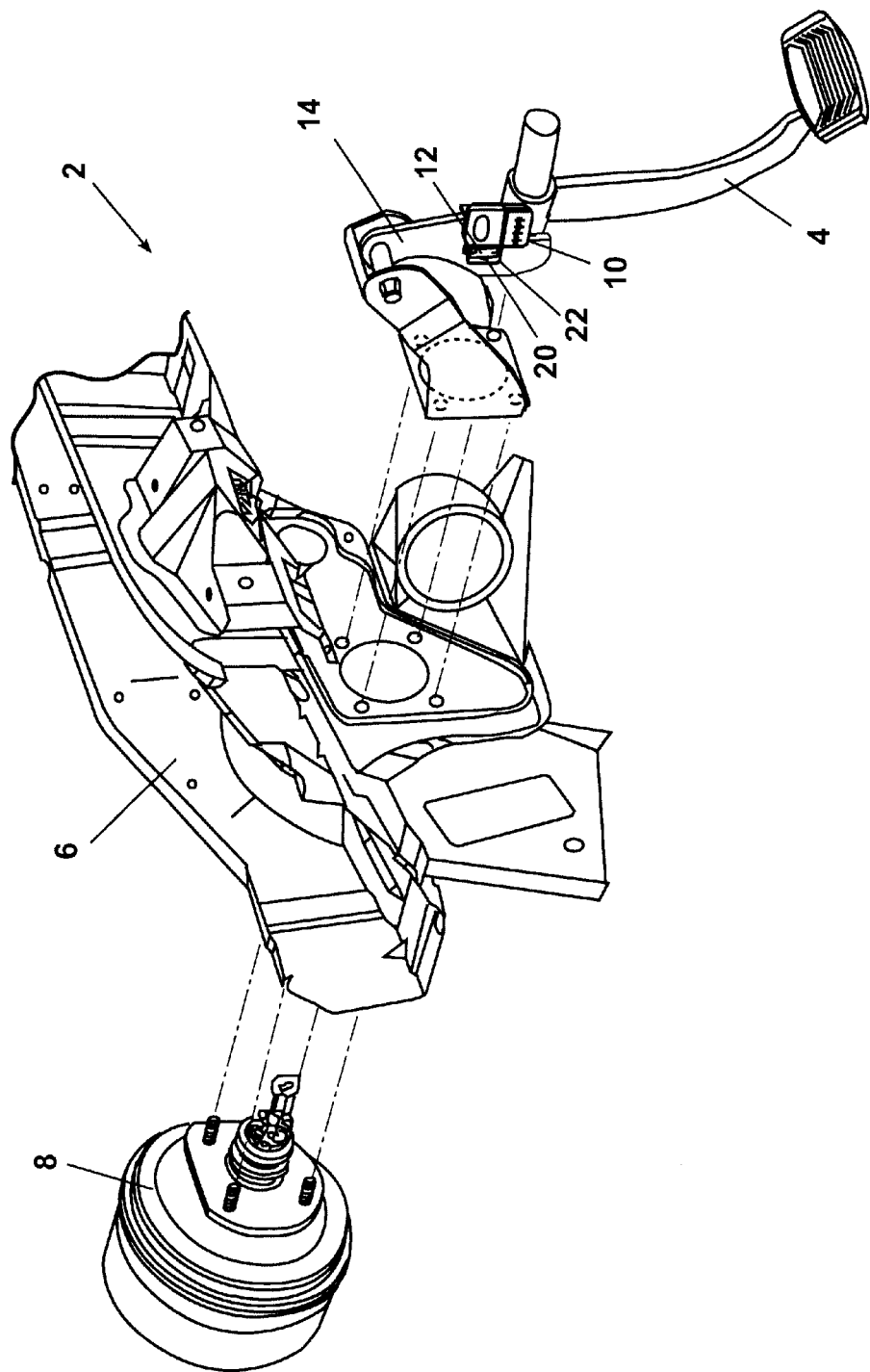
FIG. 1 is a partially exploded, perspective view showing a first preferred embodiment of the redundancy clip of the present invention installed on an automotive brake assembly.
Figure 2:
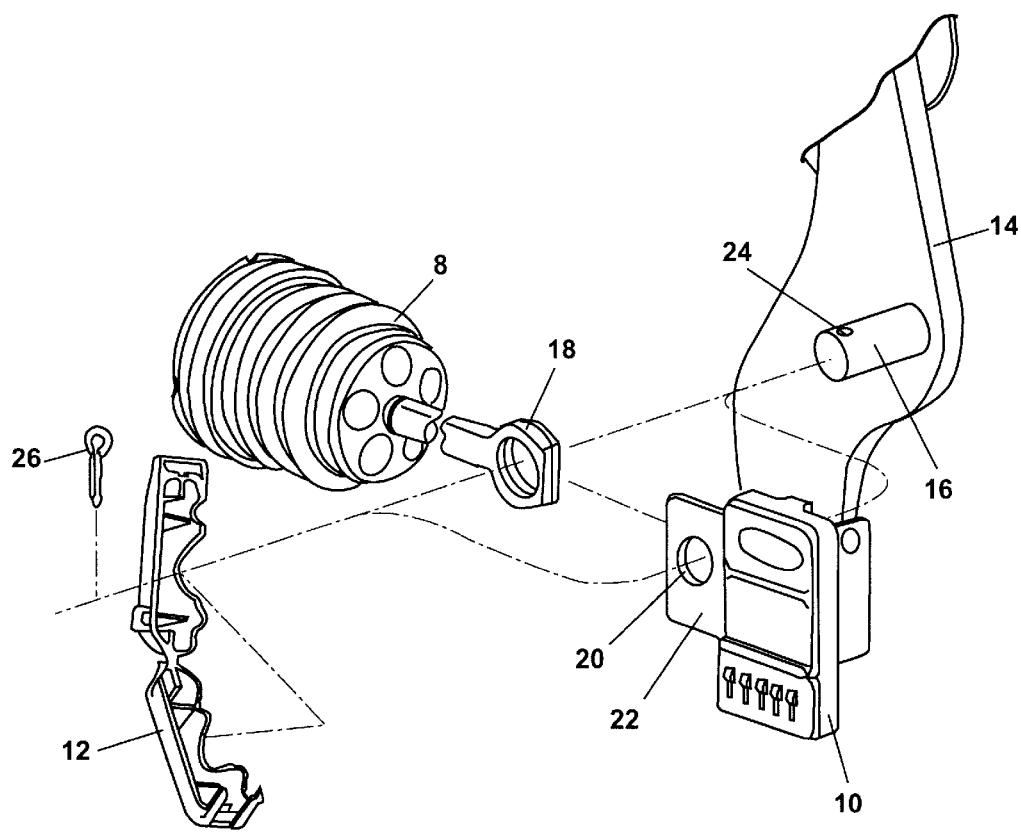
FIG. 2 is an exploded and enlarged, perspective view showing the installation of component parts of FIG. 1 with the redundancy clip of the present invention in its open and unlocked position prior to installation over a retention pin.

FIGS. 1 and 2 show a first preferred embodiment of a redundancy clip of the present invention. A vehicle subsystem 2 is shown having a brake assembly 4 which mounts to a dashboard structure 6 and subsequently to a brake hydraulic unit 8. A pin mounted device 10 is shown in its installed position on brake assembly 4. A redundancy clip 12 of the present invention is shown in its fully engaged and locked position on pin mounted device 10.

The pin mounted device 10 is mounted to a plate 14 having a pin 16. Brake hydraulic unit 8 includes a flange 18 which slidably engages over pin 16 and co-aligns with a pin aperture 20 of pin mounted device 10. Flange 18 abuts a mounting bracket 22 of pin mounted device 10. Pin 16 is selectively sized such that a retention pin aperture 24 is exposed at a distal end of pin 16 after installation of both pin mounted device 10 and flange 18. A retention pin 26 is slidably disposed within retention pin aperture 24 and at least one leg of retention pin 26 is deflected (not shown) to retain retention pin 26 within retention pin aperture 24.

Redundancy clip 12 of the present invention is then slidably disposed about pin 16 and under retention pin 26. Redundancy clip 12 includes features which will be discussed herein to prevent the installation of redundancy clip 12 unless retention pin 26 is in a fully engaged position with pin 16. Since both the dimensions of pin 16 and retention pin 26 are known, the necessary geometry when selecting redundancy clip 12 for a given installation is predetermined.

Figure 3:
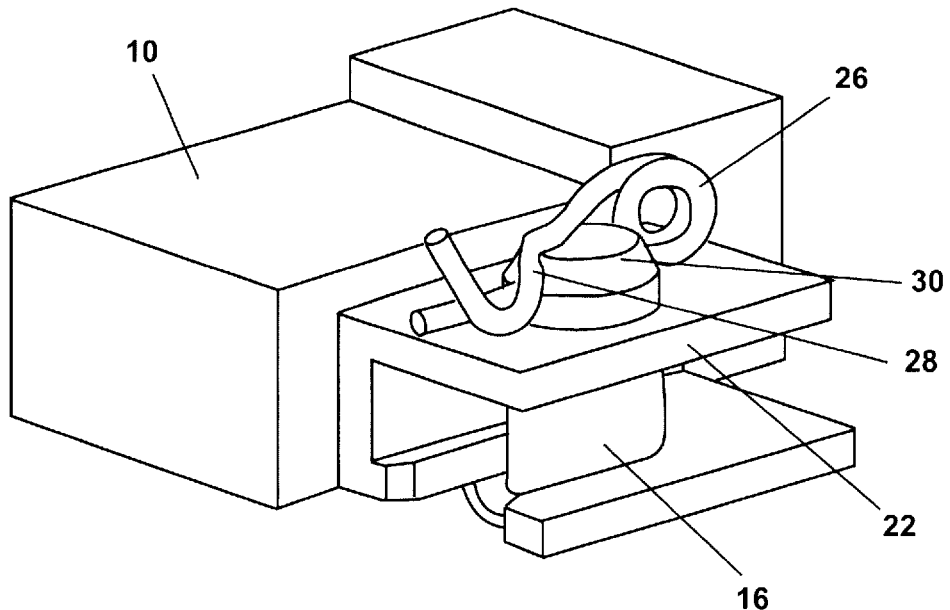
FIG. 3 is a perspective view of a pin mounted device having a retention element in a fully engaged position prior to installation of a redundancy clip of the present invention.

Referring to FIG. 3, the relationship between pin mounted device 10, pin 16 and retention pin 26 are shown in greater detail. Pin mounted device 10 is shown following engagement with pin 16. Retention pin 26 is an exemplary application of a retention pin 26 having an engagement portion 28 which ensures full engagement over a pin shoulder 30 of pin 16. In the fully engaged position shown, engagement portion 28 initially deflects during installation and snaps over pin shoulder 30 to prevent retention pin 26 from vibrating loose from its engaged position.

Figure 4:
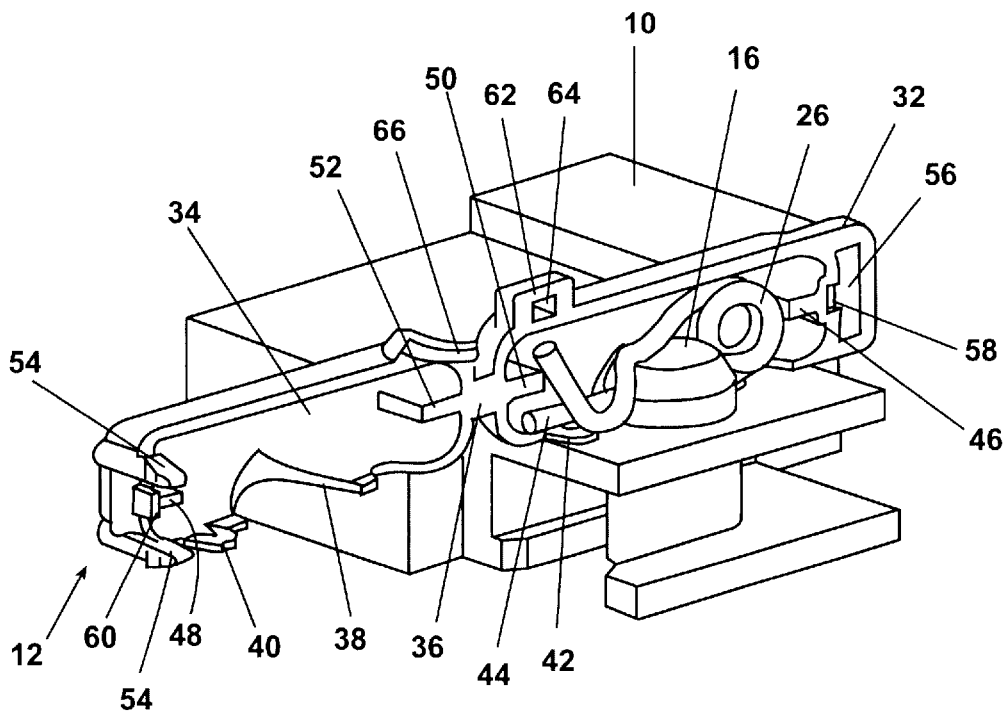
FIG. 4 is a perspective view, like that of FIG. 3, further showing the start of an installation phase of a redundancy clip of the present invention.

Referring to FIG. 4, the first preferred embodiment of a redundancy clip 12 of the present invention is shown in an initial installation step about the configuration shown in FIG. 3. Redundancy clip 12 includes a first section 32 (also herein defined as a female section), and a second section 34 (also herein defined as a male section). First section 32 and second section 34 are connectably and rotatably joined by a living hinge 36. A pin aperture 38 is disposed in at least one of first section 32 and second section 34. Pin aperture 38 can also be completely disposed in either of first section 32 or second section 34. In the application shown in FIG. 4, pin aperture 38 is approximately equally divided between each of first section 32 and second section 34. Pin aperture 38 is sized to provide a clearance fit about pin 16.

Redundancy clip 12 also includes a retention element 40 integrally provided on second section 34 and a retention element 42 integrally provided on first section 32. The purpose of both retention element 40 and retention element 42 are to slide between shoulder 22 (shown in FIG. 3) and under retention pin 26 such that redundancy clip 12 cannot be removed in a vertical direction as viewed in FIG. 4. As shown, retention element 42 is slidably disposed beneath a retention pin extension 44. A shoulder 46 adjacent to the looped end of retention pin 26 abuts an engagement shoulder 48 when the two sections of redundancy clip 12 are in the closed and engaged position. Similarly, a shoulder 50 will abut an engagement shoulder 52 when the two sections of redundancy clip 12 are in their fully engaged position. Shoulder 46, engagement shoulder 48, shoulder 50, and engagement shoulder 52 are located based on known geometry of the retention pin 26 engaged. This will be discussed further in reference to FIG. 7 below.

A deflectable hook element 54 is integrally disposed on the second section 34. The deflectable hook 54 matingly engages within a cavity 56 against a hook retainer 58 of the first section 32. A centering boss 60 aligns with the hook retainer 58 to align the second section 34 with the first section 32. To provide for the event of a failure of the living hinge 36, an embossment 62 having an aperture 64 is disposed on the first section 32, and a lever 66 disposed on the second section 34 is aligned to engage within the aperture 64. Engagement of the lever 66 within the aperture 64 assures that a failure of the living hinge 36 does not permit displacement of the living hinge end of the redundancy clip 12.

Figure 5:
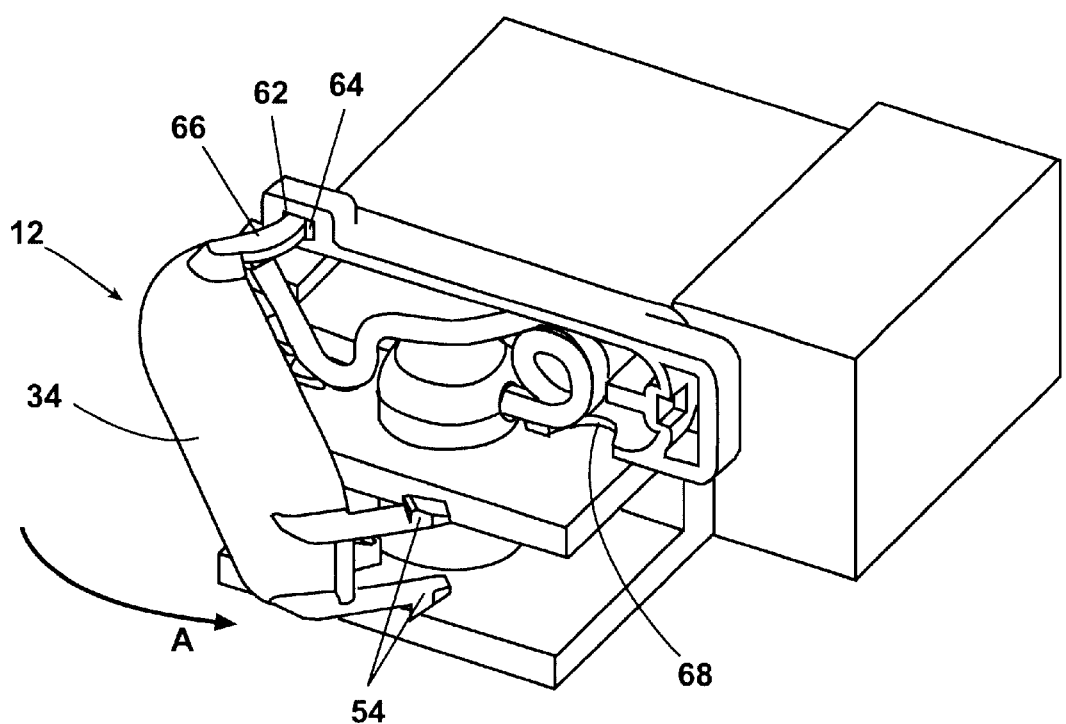
FIG. 5 is a perspective view as seen from 90° from that of FIG. 4, showing rotation of a second section of the redundancy clip about the living hinge during the installation phase of the redundancy clip of the present invention.

Referring now to FIG. 5, in the continuing installation phase of redundancy clip 12, second section 34 is rotated to engage the two clip sections. Second section 34 rotates in a closing direction A about living hinge 36 (not visible in this view) such that lever 66 engages within aperture 65 of embossment 62. One of a plurality of clearance notches 68 is also shown. The purpose of clearance notches 68 are to receive one of retention element 40 or retention element 42 (shown in FIG. 4). In the partially rotated position shown in FIG. 5, deflectable hook 54 is shown prior to engagement with first section 32.

Figure 6:
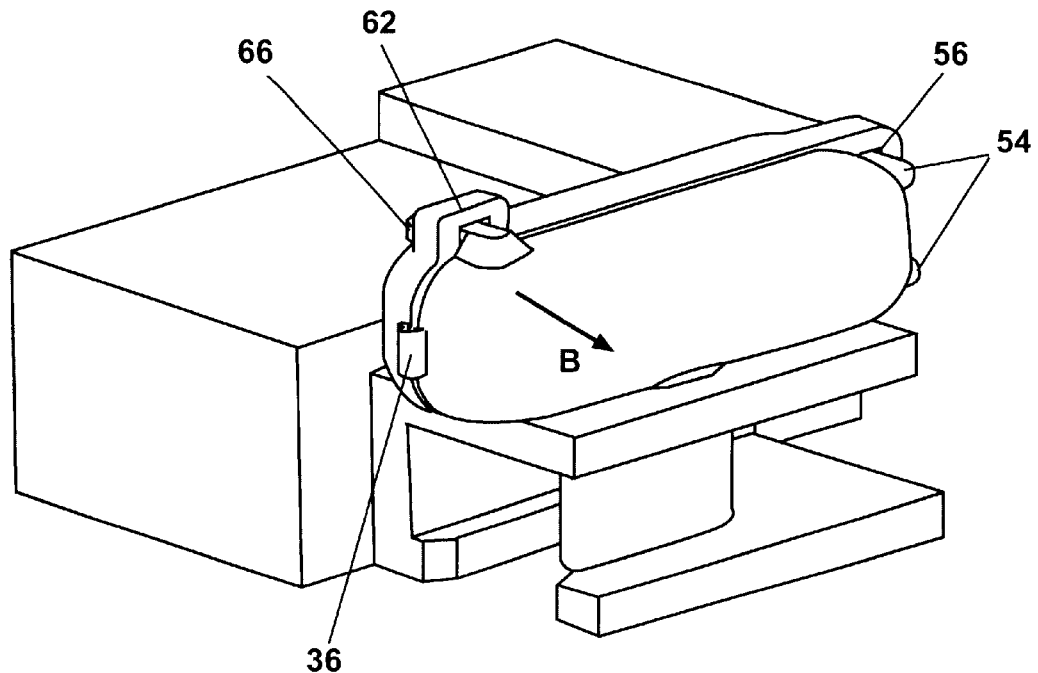
FIG. 6 is a perspective view, like that shown in FIG. 4, further showing the redundancy clip in its fully engaged and locked position.

FIG. 6 shows a fully closed and engaged position of redundancy clip 12. Deflectable hook 54 is fully engaged and seated within cavity 56. In the event of a failure of living hinge 36 as discussed above, the curved shape of lever 66 engaged in embossment 62 prevents a displacement of second section 34 in an opening direction B.

Figure 7:
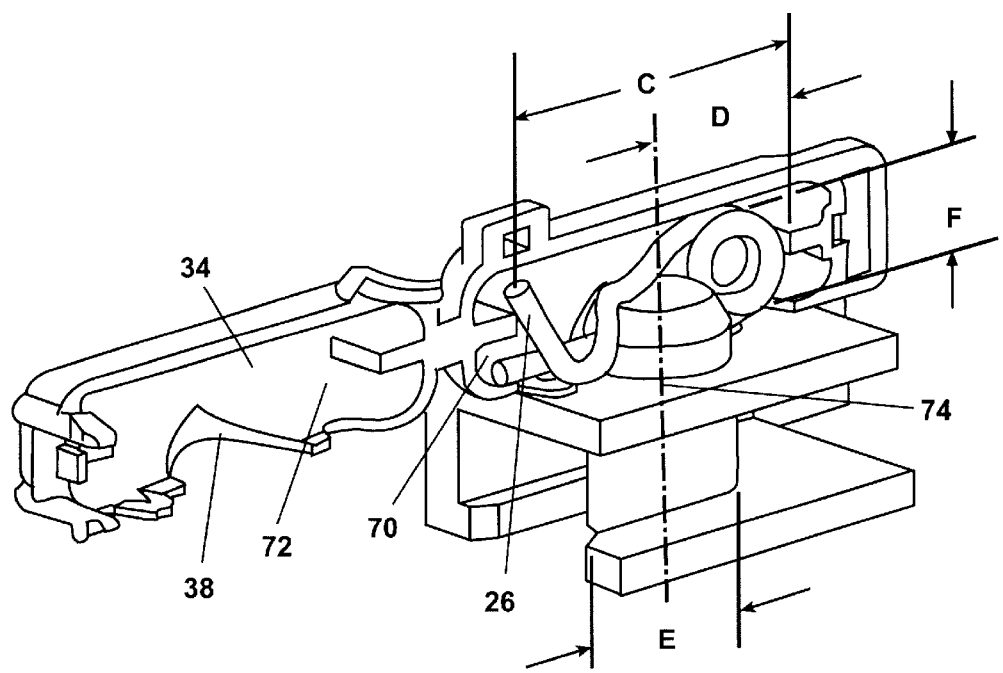
FIG. 7 is a perspective view, like that of FIG. 4, showing the redundancy clip dimensions and the relationship of the clearance aperture to the pin diameter.

Referring to FIG. 7, the geometrical relationship between pin 16, retention pin 26 and the first preferred embodiment of the present invention are shown. A clip cavity 70 and a clip cavity 72 are provided to fully enclose fully engaged retention pin 26. Pin 16 includes a pin centerline 74 and a known pin diameter E. In a fully engaged position, retention pin 26 has a known total length. A span length C is therefore provided within first section 32 and second section 34 between the shoulders previously discussed. Span length C is predetermined such that the known length of retention pin 26 seats fully within each section of the redundancy clip between the shoulders. A pin to shoulder distance D and a cavity height F are provided within the redundancy clip based on the known dimensions of a fully engaged retention pin 26. Based on the geometry of fully engaged retention pin 26 within pin 16 a redundancy clip 12 having predetermined dimensions is selected. Geometries for the plurality of known retention pins 26 can be accommodated with a plurality of standard sizes of redundancy clips of the present invention.

Figure 8:
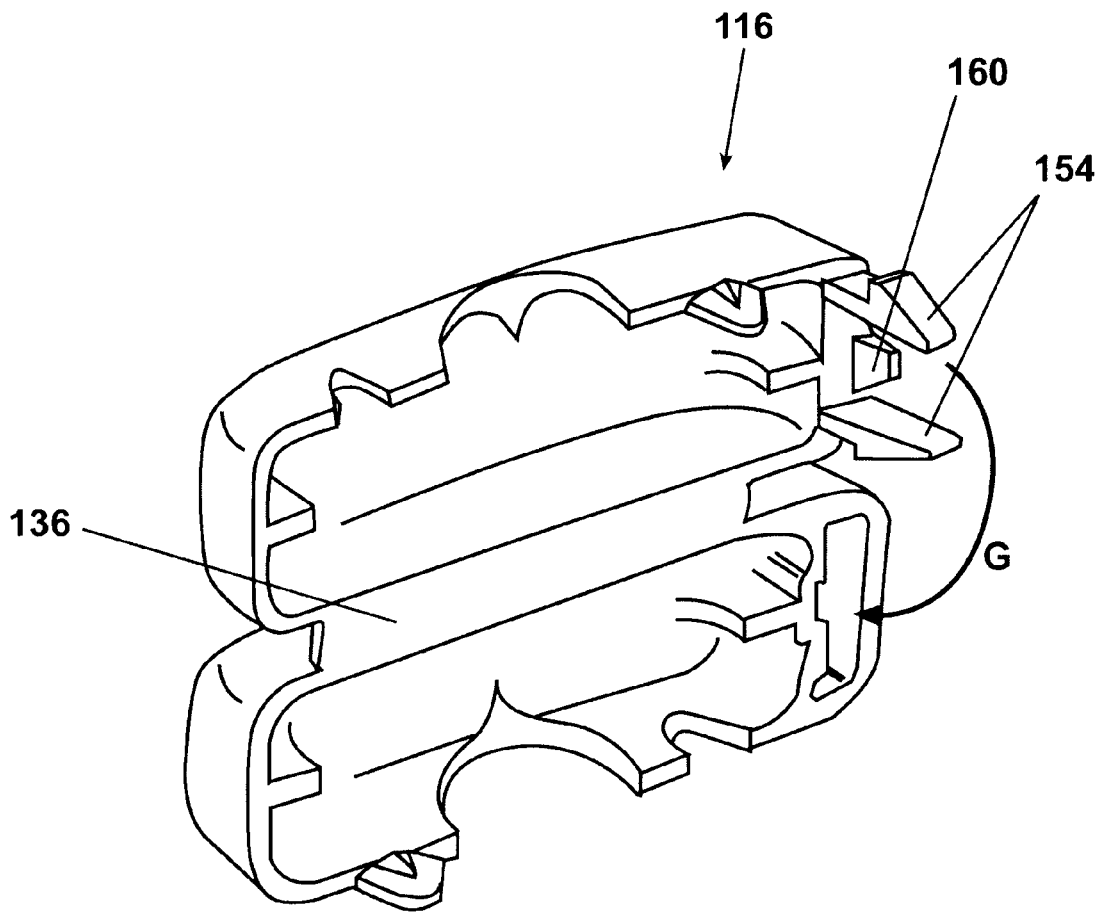
FIG. 8 is a perspective view showing a second preferred embodiment of the present invention having a longitudinal living hinge installed between adjacent sides of a redundancy clip.

As can best be observed in FIG. 8, a longitudinally hinged redundancy clip 116 includes a longitudinal living hinge 136 connectably joining longitudinal edges of longitudinally hinged redundancy clip 116. A deflectable hook 154 is positioned on an end of longitudinally hinged redundancy clip 116 adjacent to a cavity 156 (similar to cavity 56 shown in FIG. 4). A centering boss 160 is similar to centering boss 60 shown in FIG. 4. Longitudinally hinged redundancy clip 116 closes in a closing direction G as shown. Based on the length of longitudinal living hinge 136, a lever (not shown) similar to lever 66 shown in FIG. 4 can be installed or eliminated at the option of the designer. The length of longitudinal living hinge 136 provides additional assurance against a failure of longitudinal living hinge 136.

Figure 9:
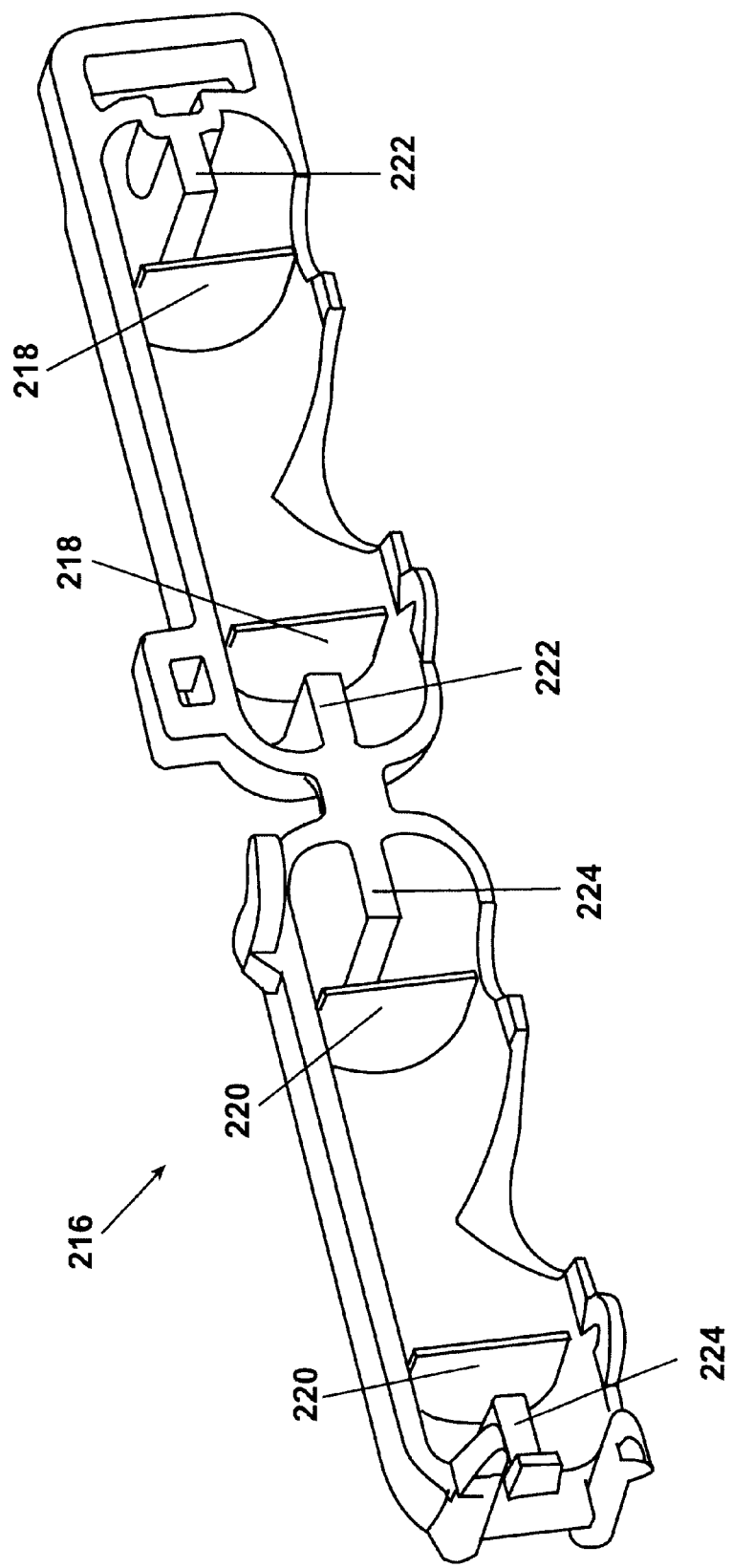
FIG. 9 is a perspective view showing a third preferred embodiment of the present invention having both rigid and flexible shoulders for engagement with a retention element.

As provided in FIG. 9, additional features of a third preferred embodiment of the present invention are detailed. In a redundancy clip 216, a pair of twist prevention shoulders 218 and a pair of mating twist prevention shoulders 220 are integrally provided. Both twist prevention shoulders 218 and mating twist prevention shoulders 220 have a reduced cross section such that the shoulders deflect when engaging a retention pin (not shown). By providing this deflection capability, additional flexibility in the design of the redundancy clip 216 is possible, such that the redundancy clip 216 can accommodate more than one retention pin design. A pair of rigid shoulders 222 matably align with a pair of mating rigid shoulders 224. These rigid shoulders are similar to the shoulders previously described herein. The addition of twist prevention shoulders 218 and mating twist prevention shoulders 220 also provide the benefit that redundancy clip 216 is prevented from spinning after redundancy clip 216 is in its closed and fully engaged position. This feature is beneficial in applications where the redundancy clip should not rotate about the pin.

Figure 10:
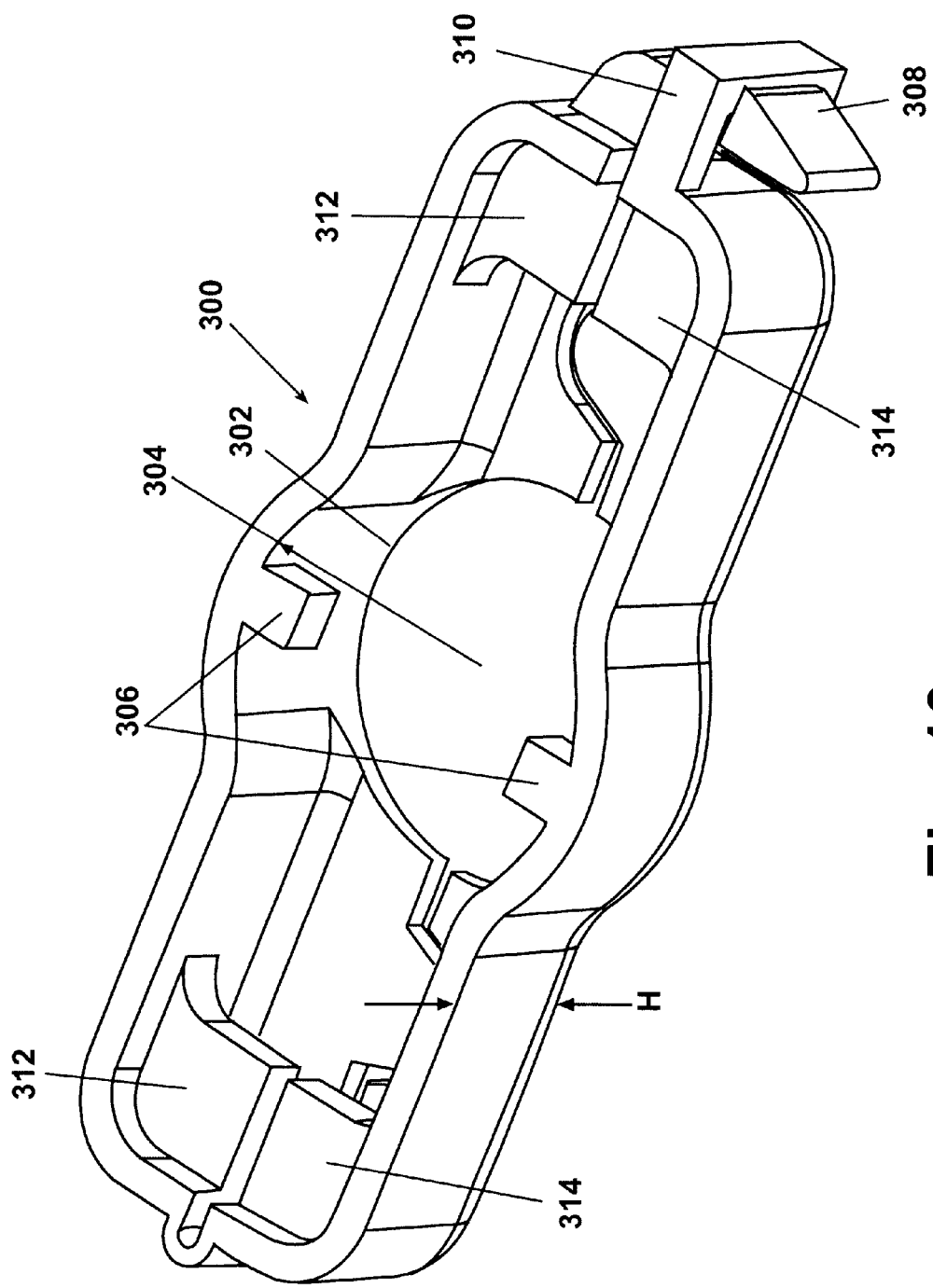
FIG. 10 is a top perspective view of a fourth preferred embodiment of the present invention for a low profile redundancy clip.

As detailed in FIG. 10, an open faced, low profile clip 300 is provided. Low profile clip 300 provides an alternate embodiment which permits placement of a redundancy clip in an application where vertical height above the pin is not available to install a redundancy clip similar to those previously discussed. Low profile clip 300 includes a retention pin aperture 302 similar to previous concepts, however, a body pin cavity 304 is provided which allows the overall width of low profile clip 300 to be reduced. A pair of pin retention bosses 306 are provided to matingly engage with the pin (not shown). A clip height H can be reduced in low profile clip 300 providing an open access to the retention pin (not shown) and visible verification that the retention pin is installed. A pair of rigid shoulders 312 and a pair of mating rigid shoulders 314 are shown which serve a similar purpose to shoulders previously discussed. Rigid shoulders 312 and mating rigid shoulders 314 are provided in a horizontal orientation to further reduce clip height H. In the embodiment shown, a single deflectable hook 308 which engages with a single hook retainer 310 is shown. Based on clip height H which is reduced for low profile clip 300, the single deflectable hook 308 is sufficient to close and fully engage the sections of low profile clip 300.

Figure 11:
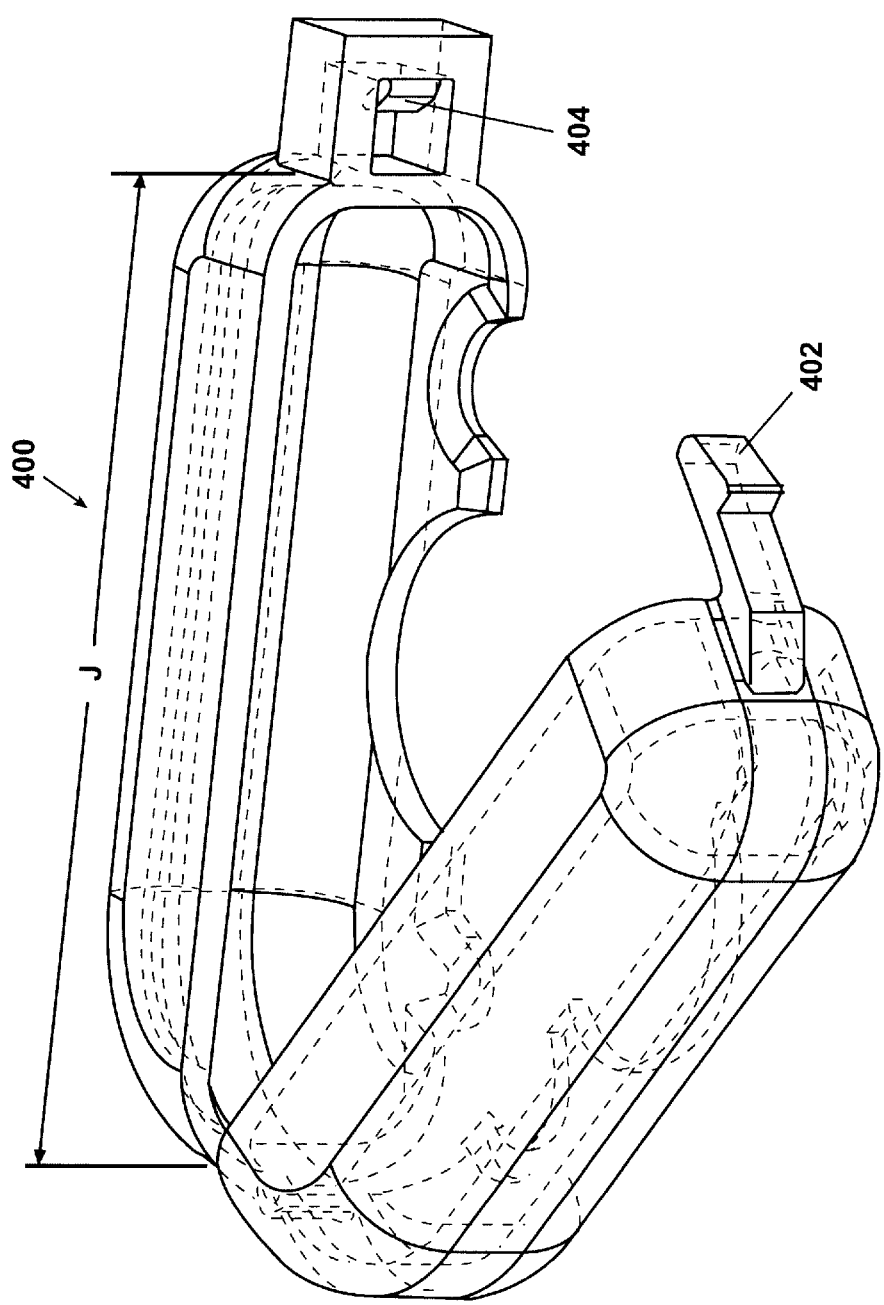
FIG. 11 is a perspective view of a fifth preferred embodiment of the present invention for encapsulating a retention pin without integral shoulders.

As additionally provided in FIG. 11, a controlled length clip 400 is shown. In applications where the length of the clip is critical, one or more shoulders normally used to engage the retention pin can be eliminated by controlling an overall clip length J such that the ends of the clip engage the retention pin in place of the shoulders. Another preferred embodiment of a single deflectable hook 402 and a single hook retainer 404 are also shown for controlled length clip 400. Single hook retainer 404 includes a living hinge end rotatably joined to controlled length clip 400 and a free end which engages single deflectable hook 402.

Figure 12:
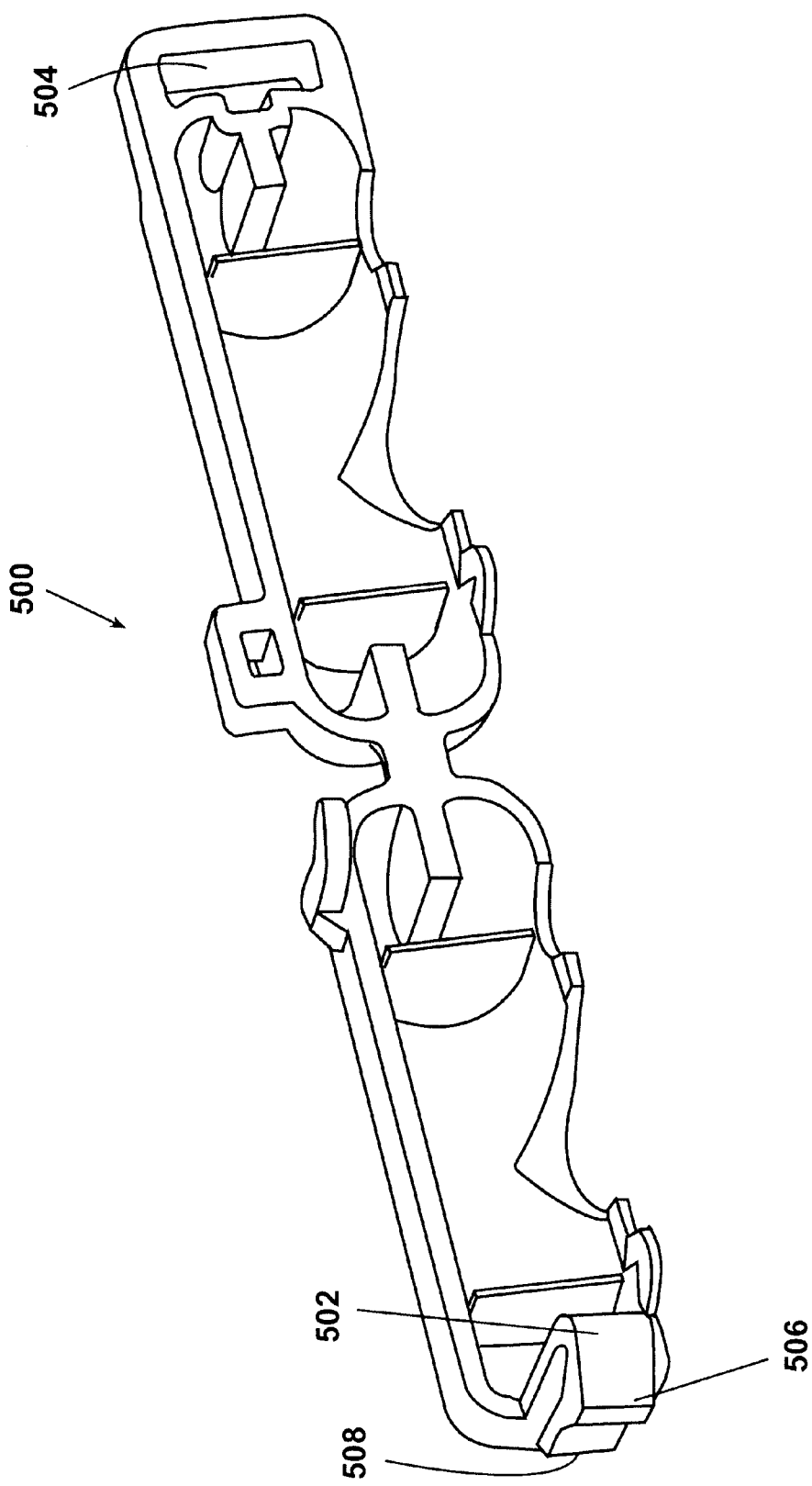
FIG. 12 is a perspective view of a sixth preferred embodiment of the present invention having a V-shaped deflectable hook.

As best detailed in FIG. 12, a single hook redundancy clip 500 is detailed. Single hook redundancy clip 500 includes a V-shaped, single deflector hook 502 which provides another preferred embodiment for engagement of a deflector hook. The V-shaped single deflector hook 502 provides a tapered face 506 which deflects V-shaped single deflector hook 502 when engaged with a hook retainer 504. An end face 508 of V-shaped single deflector hook 502 engages hook retainer 504 in a fully engaged and locked position.

The various embodiments of redundancy clips provided herein are exemplary in nature. In one preferred embodiment, a redundancy clip of the present invention is provided as an injection molded part having the living hinge integrally joining the two sections. A polymeric material is preferably used for the redundancy clip because of the cost and weight savings from use of a lightweight, yet flexible, polymeric material. The material selected should provide for multiple applications of the redundancy clip without fracture of the living hinge. In a preferred application, nylon is selected for its ability to repeatedly flex in the living hinge. The polymeric material is also selected based on the clip environment. In certain applications, for instance, the redundancy clip of the present invention could contact petroleum based liquids or gasses. A material resistant to petroleum based substances is therefore preferable in some automotive applications of the redundancy clip. Manufacturing processes other than molding are also possible, including casting, machining, cutting, and assembly of individual component parts. Additional materials including metals can be cast or machined for the component parts of the redundancy clip of the present invention if high strength for a detrimental operating environment are foreseen in the use of the redundancy clip.

While various embodiments have been disclosed it will be appreciated that other configurations may be employed within the spirit and scope of the present invention. For example, the deflectable hook has been described herein as engaging within a cavity. The deflectable hook can also install with an external engagement. The deflectable hook can also have alternate shapes in addition to a common J-shape. The deflectable hook can also be replaced by a friction closing device such that a circumferential deflection within a receiving element occurs during locking of the redundancy clip sections. The hook can also be provided as a female member which extends over and engages with a receiving male member. A lanyard device or an extended retainer can replace the living hinge such that individual sections of the redundancy clip are retained both prior to assembly and following disassembly of the redundancy clip. The body of the redundancy clip is described and shown herein as a two-section body with a living hinge between sections. Multiple/additional sections can also be used, such as a body and two closing members or a three-part body, as well as a design having a main body with a hinged cover. While various materials and dimensions have been disclosed, it should be appreciated that others may be employed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A retention pin redundancy system comprising:

a housing having at least two sections and a clearance aperture;

at least one shoulder located on at least one of said at least two sections at a distance determinable from said clearance aperture;

a plurality of retention pins each having a length determining said distance; and a connecting pin slidably receiving one of said plurality of retention pins, said connecting pin being encapsulated by said housing within said clearance aperture such that said one retention pin is in a fully engaged position with said at least one shoulder.

2. The system of claim 1, wherein said housing is injection molded.

3. The system of claim 2, wherein said housing is injection molded of a polymeric material.

4. The system of claim 1, wherein said housing is a casting formed of a metallic material.

5. The system of claim 1, further comprising:

said housing is formable as a machined component; and said machined component is selectable from one of a polymeric material and a metallic material.

6. The system of claim 1, wherein said clearance aperture is located entirely within a select one of said at least two sections.

7. The system of claim 1, wherein:

said at least two sections are divisible into a first section and a second section;

said clearance aperture is proportionately divisible into a first aperture portion and a second aperture portion; and said first aperture portion is located in said first section and said second aperture portion is located in said second section.

8. The system of claim 1, wherein:

said housing has a longitudinal centerline;

said at least one shoulder is divisible into at least two pairs of shoulders;

a longitudinal pair of said at least two pairs of shoulders is arranged approximately parallel to said longitudinal centerline in each of said at least two sections; and a perpendicular pair of said at least two pairs of shoulders is arranged approximately perpendicular to said longitudinal centerline in each of said at least two sections.

9. The system of claim 8, wherein:

each of said longitudinal pair is formed as a rigid element; and each of said perpendicular pair is formed as a flexible element.

10. The system of claim 1, wherein said at least one shoulder includes a first shoulder and a second shoulder in each of said at least two sections, said first shoulder being disposed in approximately parallel alignment with said second shoulder.

* * * * *